United States Patent

Ervay et al.

[11] Patent Number: 5,569,519
[45] Date of Patent: Oct. 29, 1996

[54] LOOSE FILL PACKING ELEMENT

[75] Inventors: Loren D. Ervay, Olean; Brownislaus L. Lewandowski, Black Creek; Warren G. Vincent, Randolph, all of N.Y.

[73] Assignee: Enviro-Pac Inc., Portville, N.Y.

[21] Appl. No.: 668,303

[22] Filed: Mar. 13, 1991

[51] Int. Cl.⁶ .................................................. B32B 3/00
[52] U.S. Cl. ........................ 428/156; 428/192; 428/213; 428/537.5; 493/967; 206/523; 206/584
[58] Field of Search ........................... 428/156, 174, 428/34.2, 192, 167, 537.5, 213, 400, 401, 402, 903.3; 493/967; 206/523, 584

[56] References Cited

U.S. PATENT DOCUMENTS

| | | | |
|---|---|---|---|
| 2,649,958 | 8/1953 | Rausch | 206/46 |
| 3,074,543 | 1/1963 | Stanley | 206/46 |
| 3,191,844 | 6/1965 | Comstock | 206/521.1 |
| 3,568,830 | 3/1971 | Moren | 206/65 |
| 3,887,672 | 6/1975 | Stahnecker | 264/51 |
| 4,104,440 | 8/1978 | Collins | 428/402 |
| 4,169,179 | 9/1979 | Bussey, Jr. | 428/159 |
| 4,500,586 | 2/1985 | Bussey | 428/174 |
| 4,514,453 | 4/1985 | Bussey, Jr. | 428/159 |
| 4,599,269 | 7/1986 | Kohaut et al. | 428/397 |
| 4,621,022 | 11/1986 | Kohaut et al. | 428/397 |
| 4,737,390 | 4/1988 | Fricano et al. | 428/34.2 |
| 5,151,312 | 9/1992 | Boeri | 428/156 |
| 5,230,943 | 7/1993 | Pregont | 428/156 |

Primary Examiner—Donald Loney
Attorney, Agent, or Firm—Joseph P. Gastel

[57] ABSTRACT

A loose fill packing element consisting of a concave body of molded non-woven paper fibers having a wall of varying thickness with ridges thereon and having a shape of two irregular bulbous end portions on the opposite sides of a smaller central waist portion.

2 Claims, 1 Drawing Sheet

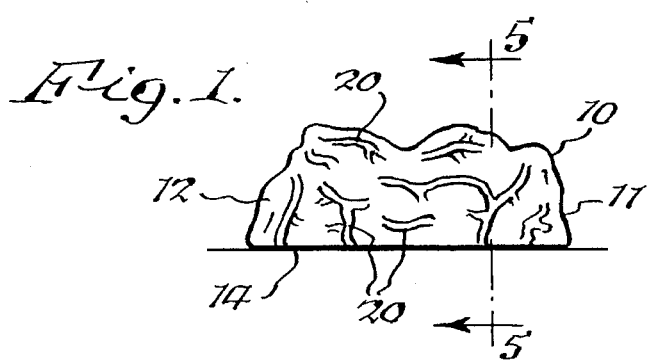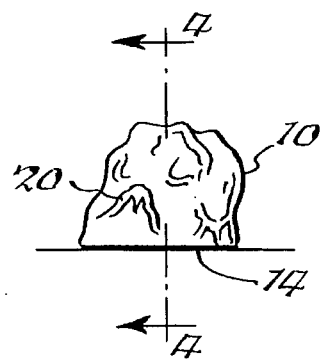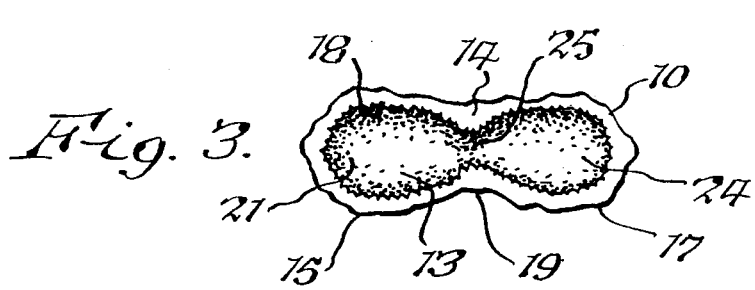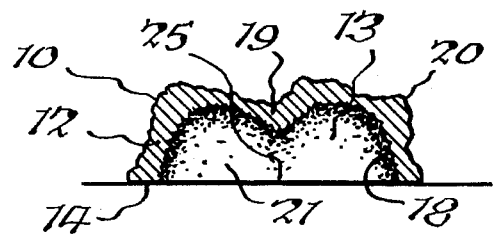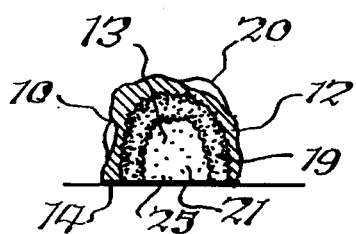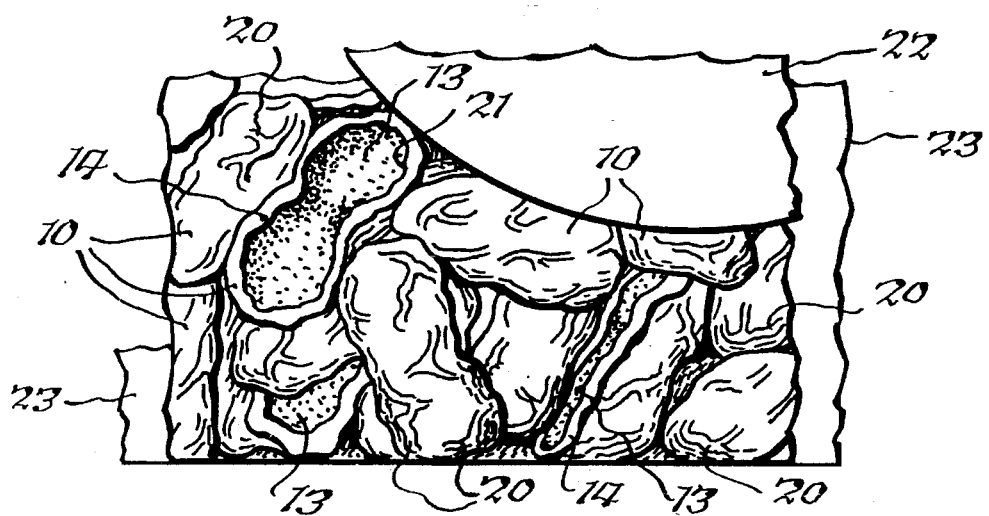

LOOSE FILL PACKING ELEMENT

BACKGROUND OF THE INVENTION

The present invention relates to an improved loose fill packing material for cushioning objects in shipping containers.

By way of background, there are in existence numerous types of loose fill packing elements and materials. Common types in vogue consist of particles of different shapes fabricated from various types of foamed plastic material, such as polystyrene. The problem with such materials is that they are not biodegradable and thus are environmentally undesirable.

SUMMARY OF THE INVENTION

It is the primary object of the present invention to provide a loose fill packing element which is environmentally advantageous for the dual reason that it is fabricated from waste paper fibers and thus is beneficial from a conservation aspect, and, further, it is biodegradable and it is thus beneficial from an environmental aspect.

Another object of the present invention is to provide a loose fill packing element which is light in weight and which occupies a relatively large volume within a container.

A further object of the present invention is to provide an improved loose fill packing element of a configuration which will not nest appreciably with adjacent loose fill packing elements and which will also provide good frictional engagement with adjacent loose fill packing elements.

Still another object of the present invention is to provide loose fill packing elements which will provide superior shock absorption qualities because they are fabricated from paper fibers which have this characteristic. Other objects and attendant advantages of the present invention will readily be perceived hereafter.

The present invention relates to a loose fill packing element comprising a concave body of molded non-woven paper fibers. The various aspects of the present invention will be more fully understood when the following portions of the specification are read in conjunction with the accompanying drawings wherein:

BRIEF DESCRIPTION OF THE DRAWINGS

FIG. 1 is a side elevational view of an improved loose fill packing element of the present invention;

FIG. 2 is an end elevational view of the loose fill packing element of FIG. 1;

FIG. 3 is a bottom plan view of the loose fill packing element of FIG. 1;

FIG. 4 is a cross sectional view taken substantially along line 4—4 of FIG. 2;

FIG. 5 is a cross sectional view taken substantially along line 5—5 of FIG. 1; and FIG. 6 is a fragmentary view of the inside of a container with a plurality of loose fill packing elements of the present invention surrounding an object which is packed within the container.

DESCRIPTION OF THE PREFERRED EMBODIMENTS

The improved loose fill packing element 10 of the present invention includes a molded hollow concave slightly flexible body 11 consisting of molded non-woven paper fibers.

The body 11 includes a continuous wall 12 defining the hollow interior 13. The wall 12 is slightly flexible and terminates at an undulating or irregular multiple curved edge 14 which lies in a substantially single plane and defines an opening having two spaced relatively large portions connected by a smaller gap portion 25.

The body 11 has a configuration which is similar to a half of a peanut shell and generally includes two bulbous end portions 15 and 17 with a relatively narrow waist portion 19 therebetween. The wall 12 is of varying thickness (FIGS. 3, 4 and 5). The outer surface of wall 12 includes ridges 20 of various sizes, shapes and extents which are formed during a molding process. Each loose fill packing element 10 differs from every other like loose fill packing element 10 in wall thickness and outer surface ridge configuration, although it may have an identical configuration of its inner surface 21. This is due to the fact that it is formed on a mold by the vacuum accretion of paper fibers from a slurry consisting solely of paper which has been made into a pulp in water without any additives, and after it has been formed it is cured by heat. The inner surface 21 has a draft to permit it to be removed from the mold (not shown) on which it is formed. The inner surface 21 has stippled pattern thereon which is an image of the foraminous vacuum mold on which it is formed. Any type of paper can be used including but not limited to computer paper, mixed office papers, kraft paper, newspaper and any other type of waste paper. The hardness of the loose fill packing element 10 is determined by its composition. In this respect, certain paper pulps, such as kraft, produce more rigid packing elements 10, and thus the flexibility of the body will vary with the type of fiber therein.

As noted above, each loose fill packing element 10 is molded by a vacuum molding process from a paper fiber slurry. It is this molding process which causes the different nonuniform wall thickness of each loose fill packing element 10. It is also this molding process which causes the different ridge structure 20 of each loose fill packing element 10 because of variations in fiber deposition.

In FIG. 6 a plurality of loose fill packing elements 10 are shown supporting an object 22 in a container 23, which is usually a shipping container. As is well known, the purpose of the loose fill packing elements 10, in surrounding the object 12, is to protect it from the shocks to which the container 23 is subjected. Furthermore, the purpose of the elements 10 is to add as little weight as possible to the container 23 while occupying a maximum amount of space therein. The fact that the elements 10 are made of paper fibers is beneficial for shock absorption because they absorb the shocks better than the plastic fillers, such as polystyrene, because they are less springy. Furthermore, because of the outer configuration, namely, the bulbous nature consisting of bulbous portions 15 and 17 with an intermediate smaller waist portion 19, the outer surfaces of adjacent elements 10 will prevent their slipping relative to each other because in many cases bulbous portions of one element 10 will tend to gravitate against the waist portion of adjacent elements 10. Furthermore, in certain instances, the waist portions of adjacent elements 10 will engage each other. Additionally, the configuration of the body 11 is such that the opening 24, and especially gap portion 25, defined by edge 14 is smaller than the major external portion of wall 12 of an adjacent-like element 10, and thus adjacent elements 10 cannot nest any substantial amount within each other, although it is possible that the end or very top of one element 10 can enter to a slight degree into an adjacent element 10. In this respect, the undulating irregular multiple curved edge 14 is especially instrumental in preventing adjacent elements 10 from nesting, considering that the closest opposite edge portions define a narrow gap 25 which is smaller than any major outer portion of element 10. Additionally, the ridges 20 of adjacent elements 10 provide gripping surfaces with adjacent elements 10 to thereby lessen the tendency for them to slide relative to each other when they are packed with an object 22 within container 23. Also since the wall 12 is of varying thickness, the thinner parts will tend to flex more easily than the thicker parts and this flexing contributes to shock absorption.

As noted above, since the elements 10 are fabricated from waste paper fibers, they serve a dual function in addition to their primary function as a loose fill packing material, namely, they are a source for the reclamation of waste paper, and, in addition, they are biodegradable when they are discarded and thus are nonpolluting to the environment.

While a specific shape has been disclosed, it will be appreciated that the paper fibers may be molded in other desirable shapes. The specific element shown in the drawings is approximately one and three quarters inches long, about one-half inch high, about three quarters of an inch across bulbous parts 15 and 17 at edge 14, and about one-half inch across waist 19 at edge 14. It is to be again noted that while all elements 10 may be molded on identical molds, their wall thicknesses will vary in different ways and the random ridges 20 will be of different sizes and shapes because of the nature of the formation of the elements 10 from an aqueous paper fiber slurry by the application of vacuum to the insides of the foraminous molds.

It can thus be seen that the improved loose fill packing elements 10 of the present invention are manifestly capable of achieving the above enumerated objects, and while a preferred embodiment of the present invention has been disclosed, it will be appreciated that it is not limited thereto but may be otherwise embodied within the scope of the following claims.

What is claimed is:

1. A loose fill packing element comprising a hollow concave body including a wall of molded non-woven paper fibers and an open side, said wall including an outer surface, ridges of various sizes and shapes on said outer surface, said wall including a side wall portion which merges into a top wall portion, said side wall portion terminating at an undulating edge which defines said open side, said open side including two spaced open portions which are defined by portions of said undulating edge and are connected by a smaller open gap portion therebetween which is defined by portions of said undulating edge, said body also comprising two bulbous end portions on opposite sides of a smaller size waist portion, said open side having a first perimeter, and said outer surface having a portion of a second perimeter which is larger than said first perimeter to preclude one loose fill packing element from nesting any substantial amount with adjacent similar loose fill packing elements with which it may be packed, an undulating irregular multiple curved edge on said wall defining said opening, and said undulating multiple curved edge having at least one portion which curves inwardly toward a portion of said undulating edge which lies on the opposite side of said opening from it.

2. An assembly of loose fill packing elements each comprising a hollow concave body including a wall of molded non-woven paper fibers terminating at an opening, said wall including inner and outer surfaces, a plurality of ridges of various sizes and shapes on said outer surface, said wall of each of said elements being of varying thickness, each of said loose fill packing elements differing from every other loose fill packing element in non-uniform wall thickness and in configuration of said outer surface, said wall including a side wall portion which merges into a top wall portion, said side wall portion terminating at an undulating irregular multiple curved edge which defines said opening, said opening including two spaced open portions which are defined by portions of said undulating edge and are connected by a smaller open gap portion therebetween which is defined by portions of said undulating edge, said body also comprising two bulbous end portions on opposite sides of a smaller size waist portion, said opening having a first perimeter, said outer surface having a portion of a second perimeter which is larger than said first perimeter to preclude one loose fill packing element from nesting any substantial amount with adjacent similar loose fill packing elements with which it may be packed, and said undulating multiple curved edge having at least one portion which curves inwardly toward a portion of said multiple undulating curved edge which lies on the opposite side of said opening from it.

* * * * *